Patented May 15, 1951

2,552,541

UNITED STATES PATENT OFFICE 2,552,541

O-(HALOPHENYL) O-ALKYL AMIDOTHIO-PHOSPHATES

Lewis R. Drake and Eugene E. Kenaga, Midland, and Arthur Erbel, Bay City, Mich., assignors to The Dow Chemical Company, Midland, Mich., a corporation of Delaware No Drawing. Application June 9, 1949,
Serial No. 98,171

6 Claims. (Cl. 260—461)

This invention is directed to O-(halophenyl) O-alkyl amidothiophosphates having the formula

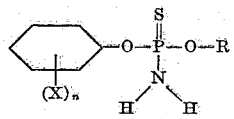

wherein R represents a cyclohexyl or alkyl radical, X represents chlorine or bromine, and $n$ is an integer from 1 to 4, inclusive.

Several methods may be employed for the preparation of the new compounds. One such procedure includes (1) reacting an O-(halophenyl) dichlorothiophosphate having the formula

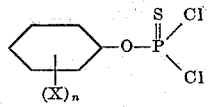

wherein X represents bromine or chlorine, and $n$ is an integer from 1 to 4, inclusive, with a monohydric alcohol, and (2) reacting the resulting intermediate O-(halophenyl) O-alkyl chlorothiophosphate with ammonia.

In carrying out the initial phase of the reaction, 1 molecular proportion of a monohydric alcohol is dissolved in at least one molecular proportion of pyridine and the resulting solution added portionwise to 1 molecular proportion of an O-(halophenyl) dichlorothiophosphate. The latter may be dissolved in benzene or other suitable solvent. The addition is carried out with stirring and at a temperature of from about 25° to 100° C.

In the second phase of the reaction, the above intermediate is reacted with an excess of ammonia, either by adding the former to an excess of liquid ammonia or by exhaustively passing anhydrous gaseous ammonia through the intermediate dissolved in benzene or other solvent. In carrying out the reaction, a large excess of ammonia is employed to provide for the reaction of by-product hydrogen chloride to form ammonium chloride. If desired, pyridine hydrochloride may be separated from the intermediate prior to reaction with ammonia.

Upon completion of the reaction, the excess ammonia is evaporated out of the crude mixture at room temperature, the resulting product filtered, and the filtrate successively washed with dilute alkali, dilute acid, and water to separate traces of reactants and by-product hydrochlorides. The solvent is then removed by evaporation to obtain the desired O-(halophenyl) O-alkyl amidothiophosphate.

In an alternative method, the new products may be prepared by reacting an O-(halophenyl) dichlorothiophosphate with an alkali metal monohydric alcoholate and the resulting intermediate product with ammonia. The alcoholate employed is preferably the sodium salt and may be prepared by reacting substantially equimolecular proportions of sodium and a suitable monohydric alcohol. One molecular proportion of an O-(halophenyl) dichlorothiophosphate is then added portionwise to one molecular proportion of the alcoholate at a temperature of from 25° to 100° C. The reaction may be carried out in an inert organic solvent and conveniently in the alcohol employed in the preparation of the alcoholate. The solvent is then removed by evaporation and the resulting intermediate processed in the previously described manner to obtain the desired product.

The O-(halophenyl) dichlorothiophosphates employed as starting materials, as above described, may be prepared by several methods. One such procedure includes reacting a bromo- or chlorophenol with phosphorus trichloride (PCl₃) in the presence of magnesium chloride, as catalyst, to produce an O-(halophenyl) dichlorophosphite intermediate of the formula:

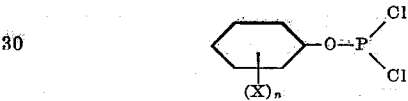

wherein X represents chlorine or bromine, and $n$ is an integer from 1 to 4, inclusive. This intermediate is then reacted with sulphur at elevated temperatures. In carrying out the above reaction, 7 molecular proportions of phosphorus trichloride, 1 molecular proportion of the halophenol, and 0.01 molecular proportion of magnesium chloride are mixed together and heated at the boiling temperature of phosphorus trichloride (76° to 82° C.) and under reflux. Upon completion of the reaction as noted by the cessation of hydrogen chloride evolution, excess phosphorus trichloride is stripped from the reaction zone by fractional distillation under reduced pressure, and 1 molecular proportion of sulphur added to the residual mixture. The latter is warmed at 150° to 170° C. for about ½ hour to accomplish the dispersion of the sulphur. The temperature of the reaction mixture is then gradually raised until an exothermic reaction is initiated between the O-(halophenyl) dichlorophosphite and sulphur, whereupon the pot temperature rapidly rises to about 240° C. Upon completion of the reaction, the crude mixture is fractionally distilled under reduced pressure to obtain the desired product.

The O-(halophenyl) O-alkyl amidothiophosphate products of the present invention are oily liquids or crystalline solids, substantially insoluble in water, somewhat soluble in many organic solvents, and noncorrosive to the skin of man and higher animals. They are of value as toxic constituents of insecticidal and fungicidal compositions.

The following examples illustrate the invention but are not to be construed as limiting.

*Example 1.—O-(4-chlorophenyl) O-ethyl amidothiophosphate*

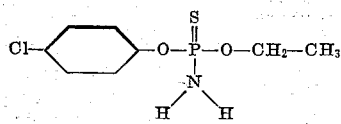

2.3 grams (0.05 mole) of ethanol was dissolved in 3.95 grams (0.05 mole) of pyridine and the resulting solution added portionwise with stirring to 13 grams (0.05 mole) of O-(4-chlorophenyl) dichlorothiophosphate (having a boiling point of 124°–126° C. at 4 millimeters' pressure, a density of 1.5005 at 25° C., and a refractive index $n/D$ of 1.5860 at 25° C.) dissolved in 50 milliliters of benzene. The temperature rose 17° C. during the addition and the resulting mixture was allowed to stand for 16 hours at room temperature to complete the reaction. Pyridine hydrochloride was then removed by filtration and a molecular excess of gaseous ammonia bubbled into and through the resulting mixture at temperatures gradually increasing to about 48° C. The excess ammonia was then evaporated off over a period of 16 hours and the residue filtered to separate ammonium chloride. The filtrate was successively washed with dilute aqueous sodium hydroxide, dilute aqueous hydrochloric acid, and water, and dried with anhydrous sodium sulphate. The benzene was then removed by evaporation to obtain an O-(4-chlorophenyl) O-ethyl amidothiophosphate product as a light tan oil having a density of 1.403 at 23° C. and a refractive index $n/D$ of 1.5580 at 35° C.

*Example 2.—O-(4-bromophenyl) O-ethyl amidothiophosphate*

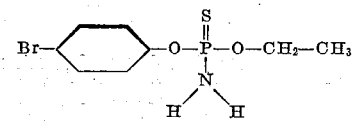

3.2 grams (0.07 mole) of ethanol was dissolved in 5.5 grams (0.07 mole) of pyridine and 50 milliliters of benzene. The above solution was added portionwise with stirring to 21.4 grams (0.07 mole) of O-(4-bromophenyl) dichlorothiophosphate (having a boiling point of 171° to 172° C. at 20 millimeters' pressure, a density of 1.7254 at 20° C., and a refractive index $n/D$ of 1.6072 at 20° C.) and the resulting mixture heated at the boiling temperature and under reflux for 2 hours. The reaction mixture was then poured into a molecular excess of liquid ammonia, and the excess ammonia evaporated off over a period of 16 hours. The resulting crude reaction product was successively washed with dilute aqueous sodium hydroxide, dilute aqueous hydrochloric acid, and water, and dried with anhydrous sodium sulphate. The benzene was then removed by evaporation to obtain an O-(4-bromophenyl) O-ethyl amidothiophosphate product as a crystalline solid. The latter was recrystallized from methanol and found to melt at from 62°–64° C.

*Example 3.—O-(2,4-dichlorophenyl) O-ethyl amidothiophosphate*

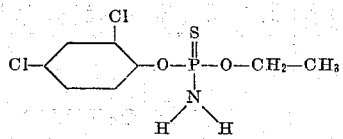

0.05 mole quantities of ethanol and O-(2,4-dichlorophenyl) dichlorothiophosphate (having a boiling point of 126°–128° C. at 2 millimeters' pressure, a density of 1.5827 at 25° C., and a refractive index $n/D$ of 1.5955 at 25° C.) were reacted together in 0.05 mole of pyridine and 50 milliliters of benzene as described in Example 1. The temperature rose 28° C. during the reaction and the resulting mixture was set aside for 16 hours. Pyridine hydrochloride was then separated from this intermediate product by filtration. The subsequent reaction of the intermediate with a molecular excess of gaseous ammonia, the filtration and the washing and drying steps were all as previously described. Upon evaporation of the benzene there was obtained an O-(2,4-dichlorophenyl) O-ethyl amidothiophosphate product as a light tan oil having a density of 1.561 at 23° C. and a refractive index $n/D$ of 1.5658 at 35° C.

*Example 4.—O-(2,4,5-trichlorophenyl) O-methyl amidothiophosphate*

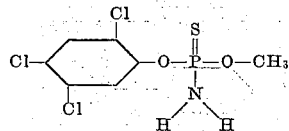

1.6 grams (0.05 mole) of methanol was dissolved in 3.95 grams (0.05 mole) of pyridine and added portionwise with stirring to 16.5 grams (0.05 mole) of O-(2,4,5-trichlorophenyl) dichlorothiophosphate (having a boiling point of 110° C. at 1 millimeter pressure, a density of 1.6653 at 20° C., and a refractive index $n/D$ of 1.6084 at 20° C.) dissolved in 50 milliliters of benzene. The temperature rose 28° C. during the addition and the resulting mixture was set aside for 16 hours. Pyridine hydrochloride was then removed by filtration and a molecular excess of gaseous ammonia bubbled into and through the filtrate at temperatures gradually increasing to about 45° C. The crude reaction mixture was then treated in the usual fashion to obtain an O-(2,4,5-trichlorophenyl) O-methyl amidothiophosphate product as a light tan oil having a density of 1.565 at 23° C. and a refractive index $n/D$ of 1.5718 at 35° C.

*Example 5.—O-(2,4,5-trichlorophenyl) O-ethyl amidothiophosphate*

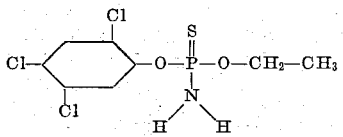

2.3 grams (0.1 mole) of sodium was dissolved in 7.9 grams (0.1 mole) of ethanol to prepare a sodium alcoholate solution. 33 grams (0.1 mole) of O-(2,4,5-trichlorophenyl) dichlorothiophosphate was added portionwise to the above solution. The addition was carried out with agitation and at temperatures gradually increasing to about 78° C. The reaction mixture was then filtered, and the filtrate diluted with 50 milliliters of benzene. A molecular excess of gaseous ammonia was then bubbled into and through the resulting mixture as previously described. The excess ammonia was evaporated off over a period of 16 hours and the reaction mixture filtered to separate ammonium chloride. The benzene was then removed by evaporation to obtain an O-(2,4,5-trichlorophenyl) O-ethyl amidothiophosphate product as a crystalline solid. The latter was recrystallized from cyclohexane and found to have a melting point of 59°–63° C., and a chlorine content of 32.52 per cent as compared to a theoretical chlorine content of 33.2 per cent.

*Example 6.—O-(2,4,5-trichlorophenyl) O-isopropyl amidothiophosphate*

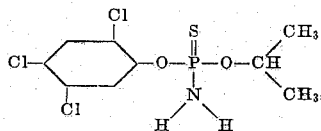

3 grams (0.05 mole) of isopropyl alcohol was dissolved in 3.95 grams (0.05 mole) of pyridine and the resulting solution added portionwise with stirring to 16.5 grams (0.05 mole) of O-2,4,5-trichlorophenyl) dichlorothiophosphate dissolved in 50 milliliters of benzene. The temperature rose 12° C. during the addition and the reaction mixture was allowed to stand at room temperature overnight. Pyridine hydrochloride was then separated by filtration, and the filtrate reacted with a molecular excess of gaseous ammonia as described in Example 1. The crude reaction product was then treated in the usual manner to obtain an O-(2,4,5-trichlorophenyl) O-isopropyl amidothiophosphate product as a tan oil having a density of 1.510 at 23° C., and a refractive index $n/D$ of 1.5630 at 35° C.

*Example 7.—O-(2,4,5-trichlorophenyl) O-secondarybutyl amidothiophosphate*

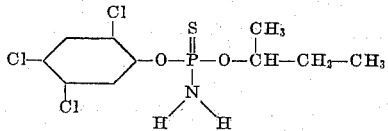

In a similar manner, 0.05 mole quantities of secondarybutyl alcohol and O-(2,4,5-trichlorophenyl) dichlorothiophosphate were reacted together in the presence of 0.05 mole of pyridine and 50 milliliters of benzene to produce O-(2,4,5-trichlorophenyl) O-secondarybutyl chlorothiophosphate. This intermediate product was filtered and a molecular excess of gaseous ammonia bubbled into and through the filtrate at temperatures gradually increasing to 58° C. The crude reaction product was then treated in the usual fashion to obtain an O-(2,4,5-trichlorophenyl) O-secondarybutyl amidothiophosphate product as a light tan oil. The latter had a density of 1.485 at 23° C., a refractive index $n/D$ of 1.5692 at 35° C., and a chlorine content of 30.73 per cent. The theoretical chlorine content for

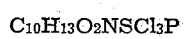

is 30.6 per cent.

*Example 8.—O-(2,4,5-trichlorophenyl) O-tertiarybutyl amidothiophosphate*

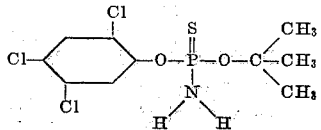

0.05 mole quantities of tertiarybutyl alcohol and O-(2,4,5-trichlorophenyl) dichlorothiophosphate were reacted together in the presence of 0.05 mole of pyridine and 50 milliliters of benzene as described in Example 6. The mixture was allowed to stand for 16 hours and thereafter filtered to separate pyridine hydrochloride. The subsequent reaction of the resulting intermediate with a molecular excess of gaseous ammonia, the filtration, washing, and drying steps were all as described in Example 1. Upon evaporation of the benzene there was obtained an O-(2,4,5-trichlorophenyl) O-tertiarybutyl amidothiophosphate product as a light tan viscous oil having a refractive index $n/D$ of 1.6082 at 35° C.

*Example 9.—O-(2,4,5-trichlorophenyl) O-normaldodecyl amidothiophosphate*

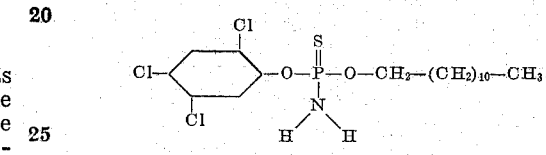

9.3 grams (0.05 mole) of normaldodecyl alcohol was dissolved in 3.95 grams (0.05 mole) of pyridine and added portionwise with stirring to 16.5 grams (0.05 mole) of O-(2,4,5-trichlorophenyl) dichlorothiophosphate dissolved in 50 milliliters of benzene. The temperature rose 25° C. during the addition. The resulting mixture was allowed to stand for 16 hours and thereafter filtered to separate pyridine hydrochloride. A molecular excess of gaseous ammonia was then introduced into and through the filtrate at temperatures gradually increasing to about 38° C. The resulting crude product was treated as described in Example 1 to obtain an O-(2,4,5-trichlorophenyl) O-normaldodecyl amidothiophosphate product as a light tan oil. The latter had a density of 1.330 at 25° C., a refractive index $n/D$ of 1.5310, and a chlorine content of 23.37 per cent as compared to a theoretical chlorine content of 23.15 per cent.

*Example 10.—O-(2,4,5-trichlorophenyl) O-cyclohexyl amidothiophosphate*

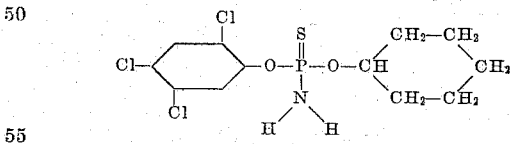

0.05 mole quantities of cyclohexanol and O-(2,4,5-trichlorophenyl) dichlorothiophosphate were reacted in the presence of 0.05 mole of pyridine and 50 milliliters of benzene as described in Example 6. The mixture was allowed to stand for 16 hours and thereafter filtered to separate pyridine hydrochloride. A molecular excess of gaseous ammonia was then bubbled into and through the filtrate at temperatures gradually increasing to about 51° C. The excess ammonia was evaporated off over a period of 16 hours and the resulting product filtered, washed and dried in the usual fashion. Upon evaporation of the benzene there was obtained an O-(2,4,5-trichlorophenyl) O-cyclohexyl amidothiophosphate product as a brown oil. The latter had a density of 1.460 at 23° C., a refractive index $n/D$ of 1.5550 at 35° C., and a chlorine content of 29.8 per cent as compared to a theoretical chlorine content of 28.5 per cent.

Example 11.—O-(2,4,6-trichlorophenyl) O-ethyl amidothiophosphate

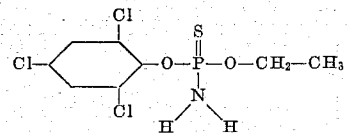

0.85 mole of ethanol and 0.05 mole quantities of sodium and O-(2,4,6-trichlorophenyl) dichlorothiophosphate (having a boiling point of 140° to 150° C., a density of 1.740 at 26° C., and a refractive index $n/D$ of 1.5925 at 35° C.) were reacted as described in Example 4 to prepare an intermediate O-(2,4,6-trichlorophenyl) O-ethyl chlorothiophosphate product. The subsequent reaction of this product with gaseous ammonia, the filtration, and the washing and drying steps were all as previously described. Upon evaporation of the benzene there was obtained an O-(2,4,6-trichlorophenyl) O-ethyl amidothiophosphate product as a dark brown oil having a density of 1.600 at 22° C. and a refractive index $n/D$ of 1.5605 at 35° C.

Example 12.—O-(2,3,4,6-tetrachlorophenyl) O-isopropyl amidothiophosphate

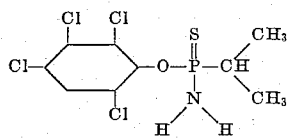

6 grams (0.1 mole) of isopropyl alcohol was dissolved in 7.9 grams (0.1 mole) of pyridine and added portionwise with stirring to 36.5 grams (0.1 mole) of O-(2, 3, 4,6-tetrachlorophenyl) dichlorothiophosphate (having a boiling point of 156°–163° at 0.8 millimeters pressure, a density of 1.7533 at 20° C., and a refractive index $n/D$ of 1.6130 at 20° C.) dissolved in 50 milliliters of benzene. The crude mixture was allowed to stand for 16 hours, and thereafter filtered to separate pyridine hydrochloride. The resulting intermediate was reacted with a molecular excess of liquid ammonia, and the excess ammonia evaporated off over a period of 16 hours. The resulting product was treated as described in Example 1 to obtain an O-(2,3,4,6-tetrachlorophenyl) O-isopropyl amidothiophosphate as a tan oil having a refractive index $n/D$ of 1.5622 at 35° C.

In a similar manner, other O-(halophenyl) O-alkyl amidothiophosphates may be prepared as follows:

O-(2-bromophenyl) O-normalbutyl amidothiophosphate by successively reacting normalbutyl alcohol with O-(2-bromophenyl) dichlorothiophosphate, and ammonia.

O-(2-chlorophenyl) O-normaldecyl amidothiophosphate by successively reacting normaldecyl alcohol with O-(2-chlorophenyl) dichlorothiophosphate, and ammonia.

O-(4-bromophenyl) O-normalhexyl amidothiophosphate by successively reacting normalhexyl alcohol with O-(4-bromophenyl) dichlorothiophosphate and ammonia.

O-(2,6-dibromophenyl) O-normal octyl amidothiophosphate by successively reacting normaloctyl alcohol with O-(2,6-dibromophenyl) dichlorothiophosphate, and ammonia.

O-(2,4,6-tribromophenyl) O-cyclohexyl amidothiophosphate by successively reacting cyclohexanol with O-(2,4,6-tribromophenyl) dichlorothiophosphate, and ammonia.

O-(2,3,4,6-tetrachlorophenyl) O-normal decyl amidothiophosphate by successively reacting normaldodecyl alcohol with O-(2,3,4,6-tetrachlorophenyl) dichlorothiophosphate, and ammonia.

O-(2,3,4,6-tetrabromophenyl) O-normalhexyl amidothiophosphate by successively reacting normalhexyl alcohol with O-(2,3,4,6-tetrabromophenyl) dichlorothiophosphate, and ammonia.

O - (2,4,6 - tribromophenyl) O - normalbutyl amidothiophosphate by successively reacting normalbutyl alcohol with O-(2,4,6-tribromophenyl) dichlorothiophosphate, and ammonia.

O-(4-chlorophenyl) O-cyclohexyl amidothiophosphate by successively reacting cyclohexanol with O-(4-chlorophenyl) dichlorothiophosphate, and ammonia.

The new O-(halophenyl) O-alkyl amidothiophosphate products have been found effective as insecticides and fungicides and are adapted to be employed for the control of agricultural and household pests. For such use, the products may be dispersed on an inert finely divided solid and employed as dusts. Also, such mixtures may be dispersed in water with the aid of a wetting agent, and the resulting aqueous suspensions employed as sprays. In other procedures, the products may be employed in oils, or in water dispersions with or without the addition of wetting or emulsifying agents.

The products of the preceding examples have been tested for the control of two-spotted spider mite, bean aphid, Mexican bean beetle, and southern army worm. In representative operations against such organisms, 100 per cent controls have been obtained with aqueous spray compositions containing from 0.12 to 3 pounds of the toxicant per 100 gallons of solution.

We claim:
1. An O-(halophenyl) O-alkyl amidothiophosphate having the formula:

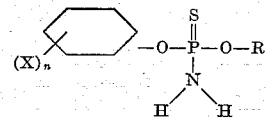

wherein R represents a radical of the group consisting of cyclohexyl and alkyl, X represents a member of the group consisting of bromine and chlorine, and $n$ is an integer from 1 to 4, inclusive.

2. O-(2,4,5-trichlorophenyl) O-ethyl amidothiophosphate.

3. O - (2,4,5 - trichlorophenyl) O - secondarybutyl amidothiophosphate.

4. O-(2,4,5-trichlorophenyl) O-isopropyl amidothiophosphate.

5. O-(2,4,6-trichlorophenyl) O-ethyl amidothiophosphate.

6. O-(2,3,4,6-tetrachlorophenyl) O - isopropyl amidothiophosphate.

LEWIS R. DRAKE.
EUGENE E. KENAGA.
ARTHUR ERBEL.

REFERENCES CITED

The following references are of record in the file of this patent:

UNITED STATES PATENTS

| Number | Name | Date |
|---|---|---|
| 2,172,241 | Dickey et al. | Sept. 5, 1939 |

FOREIGN PATENTS

| Number | Country | Date |
|---|---|---|
| 500,386 | Great Britain | Feb. 8, 1939 |